United States Patent [19]
Aoyama et al.

[11] Patent Number: 5,807,940
[45] Date of Patent: Sep. 15, 1998

[54] CATALYST FOR POLYMERIZATION AND PROCESS FOR PRODUCING A STYRENIC POLYMER BY USING THE CATALYST

[75] Inventors: Yoshiaki Aoyama; Norio Tomotsu, both of Ichihara, Japan

[73] Assignee: Idemitsu Kosan Co., Ltd., Tokyo, Japan

[21] Appl. No.: 669,381

[22] PCT Filed: Nov. 8, 1995

[86] PCT No.: PCT/JP95/02281

§ 371 Date: Jul. 11, 1996

§ 102(e) Date: Jul. 11, 1996

[87] PCT Pub. No.: WO96/15160

PCT Pub. Date: May 23, 1996

[30] Foreign Application Priority Data

Nov. 11, 1994 [JP] Japan ................................ 6-277286

[51] Int. Cl.⁶ ............................ C08F 4/642; C08F 12/08
[52] U.S. Cl. ........................ 526/160; 526/132; 526/133; 526/134; 526/142; 526/148; 526/153; 526/161; 526/165; 526/170; 526/346; 526/943; 502/103; 502/129; 502/132; 502/153; 502/154; 502/155
[58] Field of Search ........................ 526/132, 133, 526/134, 160, 161, 165, 166, 943, 142, 148, 153, 164, 170, 346; 502/103, 129, 132, 154, 155, 153

[56] References Cited

U.S. PATENT DOCUMENTS

| | | |
|---|---|---|
| 4,774,301 | 9/1988 | Campbell, Jr. et al. ............ 526/161 X |
| 5,045,517 | 9/1991 | Campbell, Jr. et al. ............ 526/160 X |
| 5,142,003 | 8/1992 | Albizzati et al. ........................ 526/125 |
| 5,420,217 | 5/1995 | Canich ................................ 526/161 X |
| 5,461,128 | 10/1995 | Takeuchi et al. ........................ 526/128 |
| 5,508,364 | 4/1996 | Sasaki et al. ........................ 526/161 X |
| 5,556,928 | 9/1996 | Devore et al. ........................ 526/135 X |

FOREIGN PATENT DOCUMENTS 0271874  6/1988   European Pat. Off. ............... 526/161

*Primary Examiner*—Fred Teskin
*Attorney, Agent, or Firm*—Oblon, Spivak, McClelland, Maier & Neustadt, P.C.

[57] ABSTRACT

The present invention provides a catalyst for polymerization comprising (A) a transition metal compound containing at least one linkage represented by the general formula (I):

$$M^1\text{—}Z\text{—}C \quad (I)$$

wherein $M^1$ represents a metal element of Groups 3 to 6 or the lanthanide series, and Z represents an element of Group 15, in one molecule, (B) (a) a compound which can form an ionic complex by the reaction with the transition metal compound or (b) a specific oxygen-containing compound, and (C) a metal compound containing alkyl group which is optionally used; and a process for producing a styrenic polymer, particularly a styrenic polymer having a highly syndiotactic configuration, comprising using this catalyst for polymerization. In accordance with the present invention, a novel catalyst for polymerization which has a high activity and enables reduction of the content of the residual metal in the polymer, simplification of the production process, decrease in the production cost, and improvement of physical properties of the polymer and a process which efficiently produces syndiotactic polystyrene can be provided.

14 Claims, No Drawings

CATALYST FOR POLYMERIZATION AND PROCESS FOR PRODUCING A STYRENIC POLYMER BY USING THE CATALYST

TECHNICAL FIELD

The present invention relates to a catalyst for polymerization and a process for producing a styrenic polymer by using this catalyst. More particularly, the present invention relates to a catalyst for polymerization which has a high activity and enables reduction of the content of the residual metal in the polymer, simplification of the production process, decrease in the production cost, and improvement of physical properties of the polymer, and a process for efficiently producing a styrenic polymer having a highly syndiotactic configuration by using this catalyst for polymerization.

BACKGROUND ART

A process for efficiently producing polymers, such as styrenic polymers and olefinic polymers having excellent properties, by using a catalyst obtained by bringing a compound which can form an ionic complex by the reaction with a transition metal compound or a reaction product of an organoaluminum compound with water into interaction with a transition metal compound, was recently developed and is attracting attention.

However, because the activity of this catalyst is not always sufficient, a large amount of the metal is left remaining in the formed polymer. The residual metal adversely affects physical properties of the polymer, and complicated after-treatments are required to reduce the adverse effect.

Styrenic polymers produced by the radical polymerization have the steric structure of the atactic configuration. These polymers are molded into articles of various shapes by a process, such as the injection molding, the extrusion molding, the blow molding, the vacuum molding, and the casting, and widely used in various applications, such as home electric appliances, office instruments, home goods, packaging containers, toys, furnitures, synthetic papers, and other industrial materials.

However, the styrenic polymers having the atactic configuration has a drawback in that heat stability and chemical resistance are inferior.

On the other hand, a styrenic polymer having the syndiotactic configuration has a higher melting point than that of conventional polymers having the atactic configuration, and is expected to be used as a heat resistant resin in various applications.

DISCLOSURE OF THE INVENTION

The present invention has an object of providing a novel catalyst for polymerization which has a high activity and enables reduction of the content of the residual metal in the polymer, simplification of the production process, decrease in the production cost, and improvement of physical properties of the polymer, and a process for efficiently producing a styrenic polymer having a highly syndiotactic configuration by using a catalyst for polymerization having a high activity.

As the result of the studies undertaken by the present inventors to achieve the above object, it was discovered that a catalyst for polymerization comprising a specific transition metal compound and a compound which can form an ionic complex by the reaction with the transition metal compound or a specific oxygen-containing compound, or a catalyst for polymerization comprising a metal compound containing alkyl group in addition to the components described above, has a high activity and enables reduction of the content of the residual metal in the polymer, simplification of the production process, decrease in the production cost, and improvement of physical properties of the polymer, and that a styrenic polymer having a highly syndiotactic configuration can efficiently be obtained by homopolymerization of a styrenic compound or copolymerization of a styrenic compound with other styrenic compound and/or other polymerizable unsaturated compounds by using the this catalyst. The present invention was completed on the basis of the discoveries.

Accordingly, the present invention provides a catalyst for polymerization comprising (A) a transition metal compound containing at least one linkage represented by the general formula (I):

wherein $M^1$ represents a metal element of Groups 3 to 6 or the lanthanoid series on the Periodic Table, Z represents an element of Group 15 of the Periodic Table, and C represents carbon, in one molecule; (B) (a) a compound which can form an ionic complex by the reaction with the transition metal compound of the component (A), or (b) an oxygen-containing compound represented by the general formula (II)

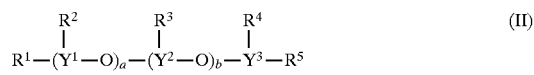

wherein $R^1$ to $R^5$ represent each an alkyl group having 1 to 8 carbon atoms and may be the same with each other or different from each other, $Y^1$ to $Y^3$ represent each an element of Group 13 of the Periodic Table and may be the same with each other or different from each other, a and b represent each a number of 0 to 50, a+b is 1 or more, and O represents oxygen, and/or by the general formula (III):

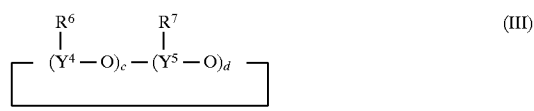

wherein $R^6$ and $R^7$ represent each an alkyl group having 1 to 8 carbon atoms and may be the same or different, $Y^4$ and $Y^5$ represent each an element of Group 13 of the Periodic Table and may be the same or different, c and d represent each a number of 0 to 50, c+d is 1 or more, and O represents oxygen; and, optionally, (C) a metal compound containing alkyl group.

The present invention also provides a process for producing a styrenic polymer comprising using the catalyst described above for polymerization.

THE MOST PREFERRED EMBODIMENT TO CARRY OUT THE INVENTION

The transition metal compound used as the component (A) in the catalyst for polymerization of the present invention contains at least one linkage represented by the general formula (I):

in one molecule. In the above general formula (I), $M^1$ represents a metal element of Groups 3 to 6 or the lanthanoid series of the Periodic Table. Preferable examples of the metal element include metal elements of Group 4, more specifically titanium, zirconium, and hafnium. Among these elements, titanium is particularly preferable. Z represents an element of Group 15 of the Periodic Table, more specifically N, P, As, Sb, or Bi. Among these elements, N is particularly preferable.

As the transition metal compound, compounds having one or more of at least one group selected from cylcopentadienyl group, substituted cyclopentadienyl groups, indenyl group, substituted indenyl groups, fluorenyl group, and substituted fluorenyl groups in one molecule thereof are preferable.

Specific examples of the transition metal compound include (cyclopentadienyl)(dimethylamido)titanium dichloride, (cyclopentadienyl)(dimethylamido)titanium dimethyl, (cyclopentadienyl)(dimethylamido)titanium dimethoxide, (methylcyclopentadienyl)(dimethylamido) titanium dichloride, (methylcyclopentadienyl) (diethylamido)titanium dichloride, (methylcyclopentadienyl)(diphenylamido)titanium dichloride, (methylcyclopentadienyl)(methylphenylamido) titanium dichloride, (methylcyclopentadienyl) (dimethylamido)titanium dimethyl, (methylcyclopentadienyl)(dimethylamido)titanium dimethoxide, (tetramethylcyclopentadienyl) (dimethylamido)titanium dichloride, (tetramethylcyclopentadienyl)(diethylamido)titanium dichloride, (tetramethylcyclopentadienyl)(diphenylamido) titanium dichloride, (tetramethylcyclopentadienyl) (methylphenylamido)titanium dichloride, (tetramethylcyclopentadienyl)(dimethylamido)titanium dimethyl, (tetramethylcyclopentadienyl)(dimethylamido) titanium dimethoxide, (pentamethylcylopentadienyl) (dimethylamido)titanium dichloride, (pentamethylcyclopentadienyl)(diethylamido)titanium dichloride, (pentamethylcyclopentadienyl)(diphenylamido) titanium dichloride, (pentamethylcyclopentadienyl) (methylphenylamido)titanium dichloride, (pentamethylcyclopentadienyl)(dimethylamido)titanium dimethyl, (pentamethylcyclopentadienyl)(dimethylamido) titanium dimethoxide, (pentamethylcyclopentadienyl) (bisdimethylamido)titanium chloride, (pentamethylcyclopentadienyl)(bisdimethylamido)titanium methyl, (pentamethylcyclopentadienyl)(bisdimethylamido) titanium methoxide, (1,2,3-trimethylindenyl) (dimethylamido)titanium dichloride, (1,2,3-trimethylindenyl)(dimethylamido)titanium dimethyl, (1,2,3-trimethylindenyl)(dimethylamido)titanium dimethoxide, (1,2,3-trimethyl-4,5,6,7-tetrahydroindenyl)(dimethylamido) titanium dichloride, (1,2,3-trimethyl-4,5,6,7-tetrahydroindenyl)(dimethylamido)titanium dimethyl, (1,2, 3-trimethyl-4,5,6,7-tetrahydroindenyl)(dimethylamido) titanium dimethoxide, (1,2-dimethyl-4,5,6,7-tetrahydroindenyl)(dimethylamido)titanium dichloride, (1,2-dimethyl-4,5,6,7-tetrahydroindenyl)(dimethylamido) titanium dimethyl, (1,2,-dimethyl-4,5,6,7-tetrahydroindenyl)(dimethylamido)titanium dimethoxide, (dimethylamido )trichlorotitanium, (diethylamido) trichlorotitanium, (dimethylamido)(dimethyl) chlorotitanium, (biscyclopentadienyl)- (bistrimethylphosphide)titanium, (pentamethylcyclopentadienyl)-(trimethylphosphide) titanium dichloride, and compounds obtained by replacing titanium in the compounds described above with zirconium or hafnium. Of course, the transition metal compound is not limited to the compounds described above, and analogous compounds of metal elements of other groups or the lanthanoid series may also be used.

The transition metal compound of the component (A) may be used singly or as a combination of two or more types.

In the catalyst for polymerization of the present invention, (a) a compound which can form an ionic complex by the reaction with the transition metal compound of the component (A) or (b) an oxygen-containing compound is used as the component (B).

As the component (a) described above, i.e. the compound which can form an ionic complex by the reaction with the transition metal compound of the component (A), coordinated complex compounds composed of a cation and an anion in which a plurality of groups are connected to a metal can be used. As the coordinated complex compound, for example, compounds represented by the following general formula (IV) or (V):

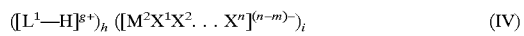

$$([L^1\text{---}H]^{g+})_h\ ([M^2X^1X^2\ldots X^n]^{(n-m)-})_i \qquad (IV)$$

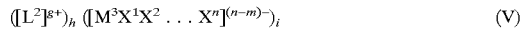

$$([L^2]^{g+})_h\ ([M^3X^1X^2\ldots X^n]^{(n-m)-})_i \qquad (V)$$

can preferably be used. In the general formulae (IV) and (V), $L^2$ represents $M^4$, $R^8R^9M^5$, or $R^{10}{}_3C$ which are described below; $L^1$ represents a Lewis acid; $M^2$ and $M^3$ represent each a metal selected from the elements of Groups 5 to 15 of the Periodic Table; $M^4$ represents a metal selected from the elements of Group 1 and Groups 8 to 12 of the Periodic Table; $M^5$ represents a metal selected from the elements of Groups 8 to 10 of the Periodic Table; $X^1$ to $X^n$ represent each hydrogen atom, a dialkylamino group, an alkoxy group, an aryloxy group, an alkyl group having 1 to 20 carbon atoms, an aryl group, an alkylaryl group, or an arylalkyl group having 6 to 20 carbon atoms, a substituted alkyl group, an organometalloid group, or a halogen atom; $R^8$ and $R^9$ represent each cyclopentadienyl group, a substituted cyclopentadienyl group, indenyl group, or fluorenyl group; $R^{10}$ represents an alkyl group, m represents the valency of $M^2$ or $M^3$ which is an integer of 1 to 7; n represents an integer of 2 to 8; g is the number of charge on $L^1$—H or $L^2$ which is an integer of 1 to 7; h represents an integer of 1 or more; and i=h×g/(n−m).

Specific examples of $M^2$ and $M^3$ include atoms of B, Al, Si, P, As, and Sb. Specific examples of $M^4$ include atoms of Ag, Cu, Na, and Li. Specific examples of $M^5$ include atoms of Fe, Co, and Ni. Specific examples of $X^1$ to $X^n$ include dialkylamino groups, such as dimethylamino group and diethylamino group; alkoxy groups, such as methoxy group, ethoxy group, and n-butoxy group; aryloxy groups, such as phenoxy group, 2,6-dimethylphenoxy group, and naphthyloxy group; alkyl groups having 1 to 20 carbon atoms, such as methyl group, ethyl group, n-propyl group, isopropyl group, n-butyl group, n-octyl group, and 2-ethylhexyl group; aryl groups, alkylaryl groups, and arylalkyl groups having 6 to 20 carbon atoms, such as phenyl group, p-tolyl group, benzyl group, pentafluorophenyl group, 3,5-di (trifluoromethyl)phenyl group, 4-tertiary-butylphenyl group, 2,6-dimethylphenyl group, 3,5-dimethylphenyl group, 2,4-dimethylphenyl group, and 1,2-dimethylphenyl group; halogens, such as F, Cl, Br, and I; and organometalloid groups, such as pentamethylstibine group, trimethylsilyl group, trimethylgermyl group, diphenylarsine group, dicyclohexylstibine group, and diphenylboron group. Specific examples of the substituted cyclopentadienyl group which is represented by $R^8$ or $R^9$ include methylcylcopentadienyl group, butylcyclopentadienyl group, and pentamethylcyclopentadienyl group.

Specific examples of the anion in which a plurality of groups are connected to a metal include $B(C_6F_5)_4{-}$, $B(C_6HF_4)_4{-}$, $B(C_6H_2F_3)_4{-}$, $B(C_6H_3F_2)_4{-}$, $B(C_6H_4F)$ $_4$—, B(C$_6$CF$_3$F$_4$)$_4$—, B(C$_6$F$_5$)$_4$—, BF$_4$—, PF$_6$—, P(C$_6$F$_5$)$_6$—, and Al(C$_6$HF$_4$)$_4$—. Specific examples of the metal cation include Cp$_2$Fe$^+$, (MeCp)$_2$Fe$^+$, (tBuCp)$_2$Fe$^+$, (Me$_2$Cp)$_2$Fe$^+$, (Me$_3$Cp)$_2$Fe$^+$, (Me$_4$Cp)$_2$Fe$^+$, (Me$_5$Cp)$_2$Fe$^+$, Ag$^+$, Na$^+$, and Li$^+$. Other examples of the cation include ions containing nitrogen, such as pyridinium ion, 2,4-dinitro-N,N-diethylanilinium ion, diphenylammonium ion, p-nitroanilinium ion, 2,5-dichloroanilinium ion, p-nitro-N,N-dimethylanilinium ion, quinolinium ion, N,N-dimethylanilinium ion, and N,N-diethylanilinium ion; carbenium compounds, such as triphenylcarbenium ion, tri(4-methylphenyl)carbenium ion, and tri(4-methoxyphenyl)carbenium ion; alkylphosphonium ions, such as CH$_3$PH$_3{}^+$, C$_2$H$_5$PH$_3{}^+$, C$_3$H$_7$PH$_3{}^+$, (CH$_3$)$_2$PH$_2{}^+$, (C$_2$H$_5$)$_2$PH$_2{}^+$, (C$_3$H$_7$)$_2$PH$_2{}^+$, (CH$_3$)$_3$PH$^+$, (C$_2$H$_5$)$_3$PH$^+$, (C$_3$H$_7$)$_3$PH$^+$, (CF$_3$)$_3$PH$^+$, (CH$_3$)$_4$P$^+$, (C$_2$H$_5$)$_4$P$^+$, and (C$_3$H$_7$)$_4$P$^+$; and arylphosphonium ions, such as C$_6$H$_5$PH$_3{}^+$, (C$_6$H$_5$)$_2$PH$_2{}^+$, (C$_6$H$_5$)$_3$PH$^+$, (C$_6$H$_5$)$_4$P$^+$, (C$_2$H$_5$)$_2$(C$_6$H$_5$)PH$^+$, (CH$_3$)(C$_6$H$_5$)PH$_2{}^+$, (CH$_3$)$_2$(C$_6$H$_5$)PH$^+$, and (C$_2$H$_5$)$_2$(C$_6$H$_5$)$_2$P$^+$.

More specifically, among the compounds represented by the general formulae (IV) and (V), the following compounds are preferably used. Preferable examples of the compound represented by the general formula (IV) include triethylammonium tetraphenyl borate, tri(n-butyl)ammonium tetraphenyl borate, trimethylammonium tetraphenyl borate, triethylammonium tetrakis(pentafluorophenyl) borate, tri(n-butyl)ammonium tetrakis(pentafluorophenyl) borate, triethylammonium hexafluoroarsenate, pyridinium tetrakis(pentafluorophenyl) borate, pyrrolinium tetrakis(pentafluorophenyl) borate, N,N-dimethylanilinium tetrakis(pentafluorophenyl) borate, and methyldiphenylammonium tetrakis(pentafluorophenyl) borate. Preferable examples of the compound represented by the general formula (V) include ferrocenium tetraphenyl borate, dimethylferrocenium tetrakis(pentafluorophenyl) borate, ferrocenium tetrakis(pentafluorophenyl) borate, decamethylferrocenium tetrakis(pentafluorophenyl) borate, acetylferrocenium tetrakis(pentafluorophenyl) borate, formylferrocenium tetrakis(pentafluorophenyl) borate, cyanoferrocenium tetrakis(pentafluorophenyl) borate, silver tetraphenyl borate, silver tetrakis(pentafluorophenyl) borate, triphenylmethyl tetraphenyl borate, triphenylmethyl tetrakis (pentafluorophenyl) borate, silver hexafluoroarsenate, silver hexafluoroantimonate, and silver tetrafluoroborate.

As the compound which can form an ionic complex by the reaction with the transition metal compound of the component (A), for example, B(C$_6$F$_5$)$_3$, B(C$_6$HF$_4$)$_3$, B(C$_6$H$_2$F$_3$)$_3$, B(C$_6$H$_3$F$_2$)$_3$, B(C$_6$H$_4$F)$_3$, B(C$_6$CF$_3$F$_4$)$_3$, BF$_3$, PF$_5$, P(C$_6$F$_5$)$_5$, and Al(C$_6$HF$_4$)$_3$ can also be used.

In the present invention, the compound which can form an ionic complex by the reaction of the transition metal compound of the component (A) can be used singly or as a combination of two or more types.

As the oxygen-containing compound of the component (b), a compound having a linear structure represented by the general formula (II):

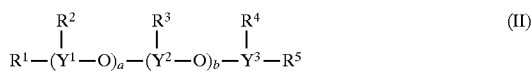

and/or a compound having a cyclic structure represented by the general formula (III):

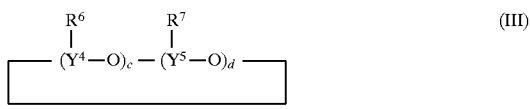

can be used.

In the above general formulae (II) and (III), $R^1$ to $R^7$ represent each an alkyl group having 1 to 8 carbon atoms. Specific examples of the alkyl group include methyl group, ethyl group, n-propyl group, isopropyl group, various types of butyl group, various types of pentyl group, various types of hexyl group, various types of heptyl group, and various types of octyl group. $R^1$ to $R^5$ may be the same with each other or different from each other. $R^6$ and $R^7$ may be the same or different. $Y^1$ to $Y^5$ represent each an element of Group 13 of the Periodic Table. Specific examples of the element of Group 13 represented by $Y^1$ to $Y^5$ include B, Al, Ga, In, and Tl. Among these elements, B and Al are preferable. $Y^1$ to $Y^3$ may be the same with each other or different from each other. $Y^4$ and $Y^5$ may be the same or different. a to d represent a number of 0 to 50. However, (a+b) and (c+d) are each 1 or more. a to d are each preferably in the range of 1 to 20, particularly preferably in the range of 1 to 5.

As the oxygen-containing compound represented by the general formula (II) or (III), a reaction product of an organoaluminum compounds and water can preferably be used. The reaction product of an organoaluminum compound and water contains, as the main components thereof, linear alkylaluminoxanes represented by the general formula (VI):

or cyclic alkylaluminoxanes represented by the general formula (VII):

In the above general formulae (VI) and (VII), $R^{11}$ represents an alkyl group having 1 to 8 carbon atoms, such as methyl group, ethyl group, n-propyl group, isopropyl group, various types of butyl group, various types of pentyl group, various types of hexyl group, various types of heptyl group, and various types of octyl group; and e represents a number of 1 to 50, preferably 1 to 20, more preferably 1 to 5.

As the organoaluminum compound which is brought into reaction with water, generally a trialkylaluminum, specifically trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, or triheptylaluminum, is preferably used. The reaction product of a trialkylaluminum and water generally contains the linear alkylaluminoxanes and the cyclic alkylaluminoxanes described above as the main components thereof, the residual trialkylaluminum, various types of condensation products, and species formed by association of these compounds in a complicated manner. Various types of reaction product are obtained depending on the conditions under which the trialkylaluminum and water are brought into contact with each other. The process for the reaction of a trialkylaluminum and water is not particularly limited, and a conventional process can be used.

Specific examples of the reaction product of an organoaluminum compound and water described above include methylaluminoxane, ethylaluminoxane, n-propylaluminoxane, isopropylaluminoxane, n-butylaluminoxane, isobutylaluminoxane, t-butylaluminoxane, pentylaluminoxane, hexylaluminoxane, and heptylaluminoxane.

As the oxygen-containing compound which contains both aluminum and boron, for example, compounds described in Japanese Patent Application Laid-Open No. Heisei 6(1994)-172438 and Japanese Patent Application Laid-Open No. Heisei 6(1994)-172439 are known.

In the present invention, the oxygen-containing compound of the component (b) described above may be used singly or as a combination of two or more types. A combination of one or more types of the compound of the component (a) and one or more types of the compound of the component (b) may also be used as the component (B).

In the catalyst for polymerization of the present invention, a metal compound containing alkyl group may be used as the component (C) if desired in addition to the components (A) and (B) described above. Examples of the metal compound containing alkyl group include an aluminum compound containing alkyl group represented by the general formula (VIII):

$$R^{12}_xAl(OR^{13})_yQ_{3-x-y} \qquad (VIII)$$

wherein $R^{12}$ and $R^{13}$ represent each an alkyl group having 1 to 8 carbon atoms, preferably 1 to 4 carbon atoms, Q represents hydrogen atom or a halogen atom, x is in the range of $0<x\leq 3$, preferably 2 or 3, most preferably 3, and y is in the range of $0\leq y<3$, preferably 0 or 1; a magnesium compound containing alkyl group represented by the general formula (IX):

$$R^{12}_2Mg \qquad (IX)$$

wherein $R^{12}$ is the same as that described above; and a zinc compound containing alkyl group represented by the general formula (X):

$$R^{12}_2Zn \qquad (X)$$

wherein $R^{12}$ is the same as that described above.

Among the metal compounds containing alkyl group described above, aluminum compounds containing alkyl group, particularly trialkylaluminums and dialkylaluminum compounds, are preferable. Specific examples of the metal compounds containing alkyl group include trialkylaluminums, such as trimethylaluminum, triethylaluminum, tri-n-propylaluminum, triisopropylaluminum, tri-n-butylaluminum, triisobutylaluminum, and tri-t-butylaluminum; dialkylaluminum halides, such as dimethylaluminum chloride, diethylaluminum chloride, di-n-propylaluminum chloride, diisopropylaluminum chloride, di-n-butylaluminum chloride, diisobutylaluminum chloride, and di-t-butylaluminum chloride; dialkylaluminum alkoxides, such as dimethylaluminum methoxide and dimethylaluminum ethoxide; and dialkylaluminum hydrides, such as dimethylaluminum hydride, diethylaluminum hydride, and diisobutylaluminum hydride. Further examples of the metal compound containing alkyl group include dialkylmagnesiums, such as dimethylmagnesium, diethylmagnesium, di-n-propylmagnesium, and diisopropylmagnesium; and dialkylzincs, such as dimethylzinc, diethylzinc, di-n-propylzinc, and diisopropylzinc. The metal compound containing alkyl group of the component (C) may be used singly or as a combination of two or more types.

The process for preparation of the catalyst for polymerization of the present invention is not particularly limited. For example, a catalyst solution may be prepared by mixing the components (A) and (B) and the optionally used component (C) together in a suitable solvent for dilution of the catalyst, such as toluene and ethylbenzene, or the catalyst components [the components (A) and (B) and the optionally used component (C)] may be successively added to the polymerization system. The order of mixing or addition of the catalyst components is not particularly limited.

The catalyst for polymerization of the present invention obtained as described above has a high activity and enables reduction of the content of the residual metal, simplification of the production process, decrease in the production cost, and improvement of physical properties of the polymer. The catalyst can advantageously be used for producing styrenic polymers and olefinic polymers.

The present invention also provides a process for producing a styrenic polymer by using the catalyst for polymerization described above.

In accordance with the process of the present invention, a homopolymer of a styrenic compound or a copolymer of a styrenic compound can efficiently be obtained by homopolymerization of a styrenic compound or copolymerization of a styrenic compound with other styrenic compounds and/or other polymerizable unsaturated compounds in the presence of the catalyst for polymerization described above.

Examples of the styrenic compound include styrene; alkylstyrenes, such as p-methylstyrene, o-methylstyrene, m-methylstyrene, 2,4-dimethylstyrene, 2,5-dimethylstyrene, 3,4-dimethylstyrene, 3,5-dimethylstyrene, and p-t-butylstyrene; halogenated styrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene; organosilicon-styrenes; vinylbenzoic acid esters; and divinylbenzene.

Examples of the other polymerizable unsaturated compound include α-olefins, such as ethylene, propylene, butene-1, pentene-1, hexene-1, heptene-1, octene-1, nonene-1, decene-1, 4-phenylbutene-1, 6-phenylhexene-1, 3-methylbutene-1, 4-methylpentene-1, 3-methylpentene-1, 3-methylhexene-1, 4-methylhexene-1, 5-methylhexene-1, 3,3-dimethylpentene-1, 3,4-dimethylpentene-1, 4,4-dimethylpentene-1, vinylcyclohexane, and vinylcyclohexene; α-olefins substituted with halogen, such as hexafluoropropene, tetrafluoroethylene, 2-fluoropropene, fluoroethylene, 1,1-difluoroethylene, 3-fluoropropene, trifluoroethylene, and 3,4-dichlorobutene-1; cyclic olefins, such as cyclopentene, cyclohexene, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, and 5-benzylnorbornene; linear diene compounds, such as butadiene, isoprene, and 1,6-hexadiene; cyclic diene compounds, such as norbornadiene, 5-ethylidenenorbornene, 5-vinylnorbornene, and dicyclopentadiene; and acetylenes, such as acetylene, methylacetylene, phenylacetylene, and trimethylsilylacetylene.

In the present invention, a single type of the styrenic compound described above may be homopolymerized, or two or more types of the styrenic compound described above may be copolymerized. At least one type selected from the styrenic compounds described above and at least one type selected from the other polymerizable unsaturated compounds described above may also be copolymerized.

When a particularly high activity of the catalyst is desired, it is preferred that the contents of acetylene compounds and indene compounds in the used monomer are made each 50 ppm or less. (Of course, this description is applied to the case in which acetylene compounds are not used as the other polymerizable unsaturated compound described above.)

The process of polymerization in the present invention is not particularly limited. The polymerization may be conducted in accordance with the bulk polymerization process or in a solvent, such as an aliphatic hydrocarbon such as pentane, hexane, or heptane; an alicyclic hydrocarbon such as cyclohexane; or an aromatic hydrocarbon such as benzene, toluene, xylene, or ethylbenzene.

The temperature of polymerization is generally 0° to 200° C., preferably 20° to 100° C. When a gaseous monomer is used, the partial pressure of the gaseous monomer is generally 300 atm or less, preferably 30 atm or less.

When the (co)styrenic polymer obtained above contains a polymeric sequence of the styrenic unit, the polymeric sequence generally has a highly syndiotactic configuration. The highly syndiotactic configuration of the polymeric sequence of the styrenic unit in the styrenic (co)polymer means that the stereochemical structure of the polymeric sequence has the highly syndiotactic configuration. In other words, phenyl groups and substituted phenyl groups of the side groups are alternately placed at the opposite positions with respect to the main chain formed with the carbon-carbon bond. The tacticity in the stereochemical structure is quantitated by the measurement of the nuclear magnetic resonance using an isotope of carbon ($^{13}C$—NMR). The tacticity measured by the $^{13}C$—NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic (co) polymer having a highly syndiotactic configuration" means polystyrene, a poly(substituted styrene), a poly(vinylbenzoic acid ester), a mixture of these polymers, or a copolymer containing constituting units of these polymers as the main components, which generally has a syndiotacticity of 75% or more, preferably 85% or more, expressed in terms of the content of the racemic diad, or 30% or more, preferably 50% or more, expressed in terms of the content of the racemic pentad. Examples of the poly(substituted styrene) described above include poly(hydrocarbon-substituted styrene), such as poly(methylstyrene), poly(ethylstyrene), poly (isopropylstyrene), poly(phenylstyrene), and poly (vinylstyrene); poly(halogenated styrene), such as poly (chlorostyrene), poly(bromostyrene), and poly (fluorostyrene); and poly(alkoxystyrene), such as poly (methoxystyrene) and poly(ethoxystyrene).

The present invention is described in more detail with reference to examples. However, the present invention is not limited by the examples.

PREPARATION EXAMPLE 1

Preparation of (pentamethylcyclopentadienyl) (diethylamido)-titanium dichloride

A reactor thoroughly purged with nitrogen was charged with 150 ml of diethyl ether. To the reactor, 0.34 ml of pentamethyl-cyclopentadiene and 1.38 ml of a 1.6 mol/liter hexane solution of n-butyllithium were added. The resultant reaction solution was mixed with a solution of $TiCl_3$ $[N(C_2H_5)_2]$ at a low temperature, and the resultant mixture was stirred at a room temperature. The formed precipitates were then removed by filtration, and 0.45 g of (pentamethylcyclopentadienyl)(diethylamido)titanium dichloride ($Cp^*TiCl_2$ $[N(C_2H_5)_2]$) was obtained from the filtrate.

The obtained product was analyzed by the proton nuclear magnetic resonance method, and the following result was obtained:

$^1$H-NMR (200 MHz, $C_6D_6$) (ppm): 0.88 (t, 6H), 1.9 (s, 15H), 3.9 (q, 4H)

PREPARATION EXAMPLE 2

Preparation of (pentamethylcyclopentadienyl) (bistrimethylsilylamido)titanium dichloride A reactor thoroughly purged with nitrogen was charged with 200 ml of diethyl ether. To the reactor, 4 g of (pentamethylcyclopentadienyl)-titanium trichloride ($Cp^*TiCl_3$) and 14.5 ml of a 1.0M hexane solution of lithium bis(trimethylsilyl)amide were added. After the resultant mixture was stirred overnight, the reaction solution was filtered. From the filtrate, 3.83 g of (pentamethylcyclopentadienyl)(bistrimethylsilylamido) titanium dichloride $[Cp^*TiCl_2$ $(N[Si(CH_3)_3]_2)]$ was obtained.

The obtained product was analyzed by the proton nuclear magnetic resonance method, and the following result was obtained:

$^1$H-NMR (200 MHz, $C_6D_6$) (ppm): 0.43 (s, 18H), 2.00 (s, 15H)

EXAMPLE 1

A 50 ml vessel which was dried and purged with nitrogen was charged with 64 mg of dimethylanilinium tetrakis (pentafluorophenyl) borate, 0.8 ml of a 2M toluene solution of triisobutylaluminum, 8.2 ml of a 0.0097M toluene solution of (pentamethylcyclopentadienyl)(diethylamido) titanium dichloride which was obtained in Preparation Example 1, and 31 ml of toluene. By mixing the above ingredients, 40 ml of a preliminary mixed catalyst solution was prepared.

A vessel which was dried and purged with nitrogen was charged with 10 ml of styrene and 0.25 ml of the preliminary mixed catalyst solution prepared above, and the polymerization was allowed to proceed at 70° C. for 4 hours. After the polymerization was stopped by addition of methanol, the obtained product was dried to obtain 3.29 g of syndiotactic polystyrene (SPS). The obtained SPS had a weight-average molecular weight (Mw) of 844,000.

EXAMPLE 2

A 50 ml vessel which was dried and purged with nitrogen was charged with 0.9 ml of toluene, 11.9 ml of a 2M toluene solution of triisobutylaluminum, 14.9 ml of a 1.6M toluene solution of methylaluminoxane, and 12.3 ml of a 0.0097M toluene solution of (pentamethylcyclopentadienyl) (diethylamido)titanium dichloride which was obtained in Preparation Example 1. By mixing the above ingredients, 40 ml of a preliminary mixed catalyst solution was prepared.

A vessel which was dried and purged with nitrogen was charged with 10 ml of styrene and 0.083 ml of the preliminary mixed catalyst solution prepared above, and the polymerization was allowed to proceed at 70° C. for 4 hours. After the polymerization was stopped by addition of methanol, the obtained product was dried to obtain 4.49 g of syndiotactic polystyrene (SPS). The obtained SPS had a weight-average molecular weight (Mw) of 783,000.

COMPARATIVE EXAMPLE 1

By the same procedures as those used in Example 1 except that (pentamethylcyclopentadienyl)(bistrimethylsilylamido)titanium dichloride prepared in Preparation Example 2 was used in place of (pentamethylcyclopentadienyl)(diethylamido)titanium dichloride, 1.51 g of syndiotactic polystyrene (SPS) was obtained. The obtained SPS had a weight-average molecular weight of 603,000.

COMPARATIVE EXAMPLE 2

By the same procedures as those used in Example 2 except that (pentamethylcyclopentadienyl)(bistrimethylsilylamido)titanium dichloride prepared in Preparation Example 2 was used in place of (pentamethylcyclopentadienyl)(diethylamido)titanium dichloride, 1.72 g of syndiotactic polystyrene (SPS) was obtained. The obtained SPS had a weight-average molecular weight (Mw) of 899,000.

Industrial Applicability

As is described in the above, the catalyst for polymerization of the present invention has a high activity and enables reduction of the content of the residual metal in the polymer, simplification of the production process, decrease in the production cost, and improvement of physical properties of the polymer. The catalyst for polymerization can advantageously be used for producing styrenic polymers and olefinic polymers. Moreover, styrenic polymers having a highly syndiotactic configuration can efficiently be obtained by homopolymerization or copolymerization of styrenic compounds using this catalyst for polymerization. Thus, the catalyst for polymerization is expected to be used advantageously for producing these polymers.

We claim:

1. A catalyst for producing a styrenic polymer having a syndiotactic configuration comprising (A) a transition metal compound containing at least one linkage represented by the formula (I):

$$M^1\text{—}Z\text{—}C \qquad (I)$$

wherein $M^1$ represents a metal element of Groups 3 to 6 or the lanthanoid series of the Periodic Table, Z represents an element of Group 15 of the Periodic Table, and C represents carbon, in one molecule, wherein said metal $M^1$ has (i) at least one substituent selected from the group consisting of cyclopentadienyl, substituted cyclopentadienyl, indenyl, substituted indenyl, fluorenyl and substituted fluorenyl; (ii) at least one substituent selected from the group consisting of di-lower-alkylamido, diarylamido and lower alkyl aryl amido and (iii) at least one substituent selected from the group consisting of lower alkyl, lower alkoxy and halogen,; and (B)(a) a compound which can form an ionic complex by the reaction with the transition metal compound of the component (A), or (b) an oxygen-containing compound represented by the formula (II)

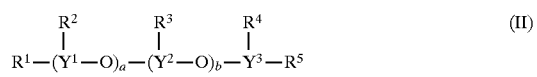

wherein $R^1$ to $R^5$ represent each an alkyl group having 1 to 8 carbon atoms and may be the same with each other or different from each other, $Y^1$ to $Y^3$ represent each an element of Group 13 of the Periodic Table and may be the same with each other or different from each other, a and b represent each a number of 0 to 50, a+b is 1 or more, and O represents oxygen, and/or by the formula (III):

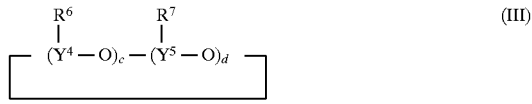

wherein $R^6$ and $R^7$ represent each an alkyl group having 1 to 8 carbon atoms and may be the same or different, $Y^4$ and $Y^5$ represent each an element of Group 13 of the Periodic Table and may be the same or different, c and d represent each a number of 0 to 50, c+d is 1 or more, and O represents oxygen.

2. A catalyst for producing a styrenic polymer having a syndiotactic configuration comprising (A) a transition metal compound containing at least one linkage represented by the formula (I):

$$M^1\text{—}Z\text{—}C \qquad (I)$$

wherein $M^1$ represents a metal element of Groups 3 to 6 or the lanthanoid series of the Periodic Table, Z represents an element of Group 15 of the Periodic Table, and C represents carbon, in one molecule, wherein said metal $M^1$ has (i) at least one substituent selected from the group consisting of cyclopentadienyl, substituted cyclopentadienyl, indenyl, substituted indenyl, fluorenyl and substituted fluorenyl; (ii) at least one substituent selected from the group consisting of di-lower-alkylamido, diarylamido and lower alkyl aryl amido and (iii) at least one substituent selected from the group consisting of lower alkyl, lower alkoxy and halogen; and (B)(a) a compound which can form an ionic complex by the reaction with the transition metal compound of the component (A), or (b) an oxygen-containing compound represented by the formula (II)

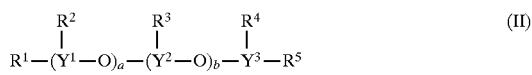

wherein $R^1$ to $R^5$ represent each an alkyl group having 1 to 8 carbon atoms and may be the same with each other or different from each other, $Y^1$ to $Y^3$ represent each an element of Group 13 of the Periodic Table and may be the same with each other or different from each other, a and b represent each a number of 0 to 50, a+b is 1 or more, and O represents oxygen, and/or by the formula (III):

wherein $R^6$ and $R^7$ represent each an alkyl group having 1 to 8 carbon atoms and may be the same or different, $Y^4$ and $Y^5$ represent each an element of Group 13 of the Periodic Table and may be the same or different, c and d represent each a number of 0 to 50, c+d is 1 or more, and O represents oxygen; and (C) a metal compound containing lower alkyl group.

3. A catalyst for polymerization according to claim 1, wherein Z in the formula (I) representing the transition metal compound of the component (A) represents a nitrogen atom.

4. A catalyst for polymerization according to claim 2, wherein Z in the formula (I) representing the transition metal compound of the component (A) represents a nitrogen atom.

5. A catalyst for polymerization according to claim 1, wherein the oxygen-containing compound of the component (B) (b) is a reaction product of an organoaluminum compound and water.

6. A catalyst for polymerization according to claim 2, wherein the oxygen-containing compound of the component (B) (b) is a reaction product of an organoaluminum compound and water.

7. A process for producing a styrenic polymer comprising polymerizing a styrenic monomer in the presence of a catalyst as claimed in claim 1.

8. A process for producing a styrenic polymer according to claim 7, wherein the styrenic polymer is a homopolymer of a styrenic compound or a copolymer of a styrenic compound with other styrenic compounds and/or other polymerizable unsaturated compounds.

9. A process for producing a styrenic polymer according to claim 7, wherein the styrenic polymer contains polymeric sequences of a styrenic compound having a highly syndiotactic configuration.

10. A process for producing a styrenic polymer according to claim 8, wherein the styrenic polymer contains polymeric sequences of the styrenic compound having a highly syndiotactic configuration.

11. A process for producing a styrenic polymer comprising polymerizing a styrenic monomer in the presence of a catalyst as claimed in claim 2.

12. A process for producing a styrenic polymer according to claim 11, wherein the styrenic polymer is a homopolymer of a styrenic compound or a copolymer of a styrenic compound with other styrenic compounds and/or other polymerizable unsaturated compounds.

13. A process for producing a styrenic polymer according to claim 11, wherein the styrenic polymer contains polymeric sequences of a styrenic compound having a highly syndiotactic configuration.

14. A process for producing a styrenic polymer according to claim 12, wherein the styrenic polymer contains polymeric sequences of the styrenic compound having a highly syndiotactic configuration.

* * * * *